Feb. 14, 1933.    H. J. SCHNEIDERWIRTH    1,897,217
PURIFICATION APPARATUS
Filed Oct. 22, 1929    2 Sheets-Sheet 1
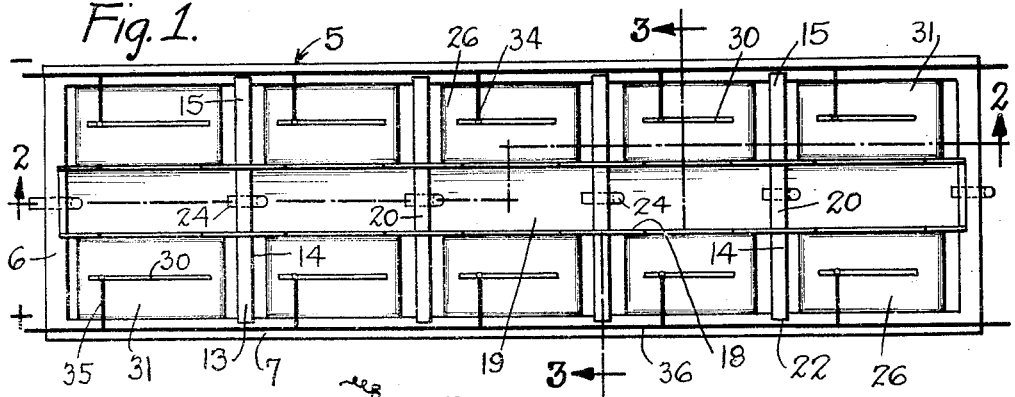
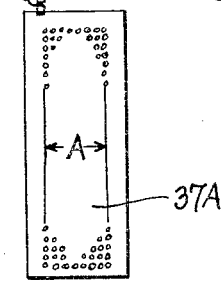
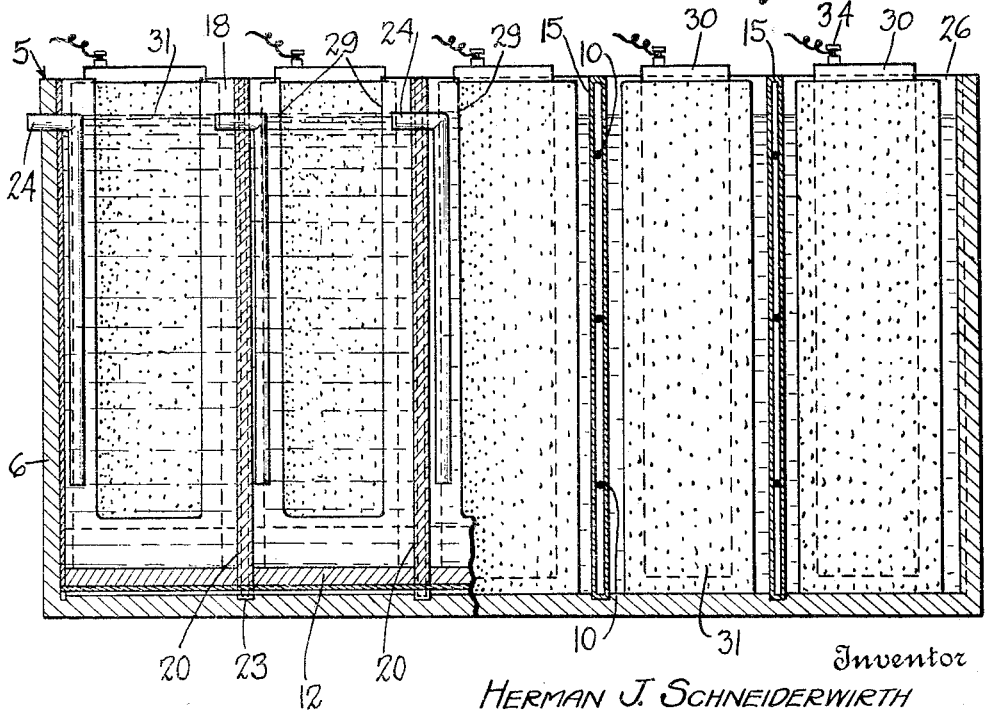
Inventor
HERMAN J. SCHNEIDERWIRTH
By His Attorney John J. Lynch Feb. 14, 1933. H. J. SCHNEIDERWIRTH 1,897,217
PURIFICATION APPARATUS
Filed Oct. 22, 1929  2 Sheets-Sheet 2
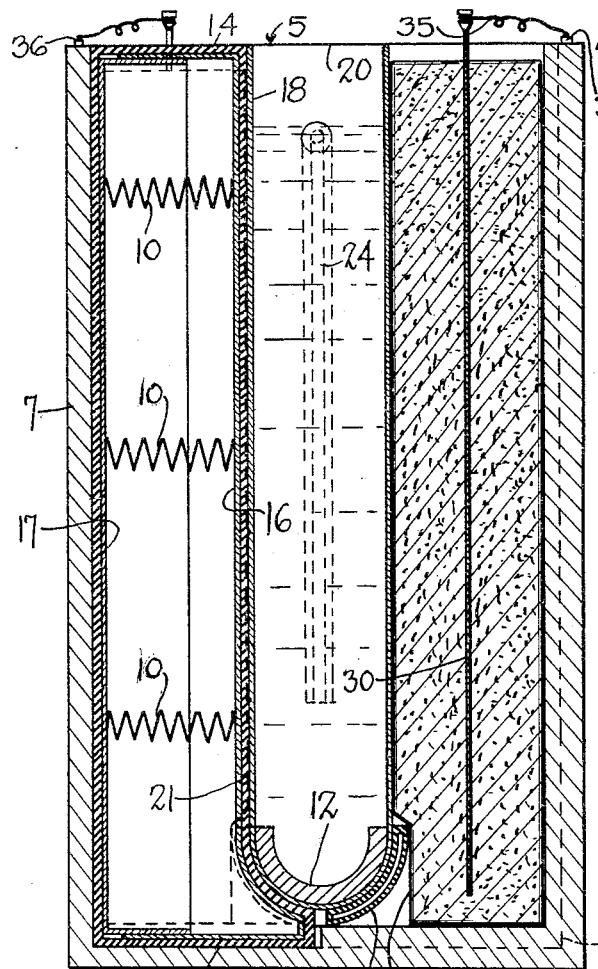
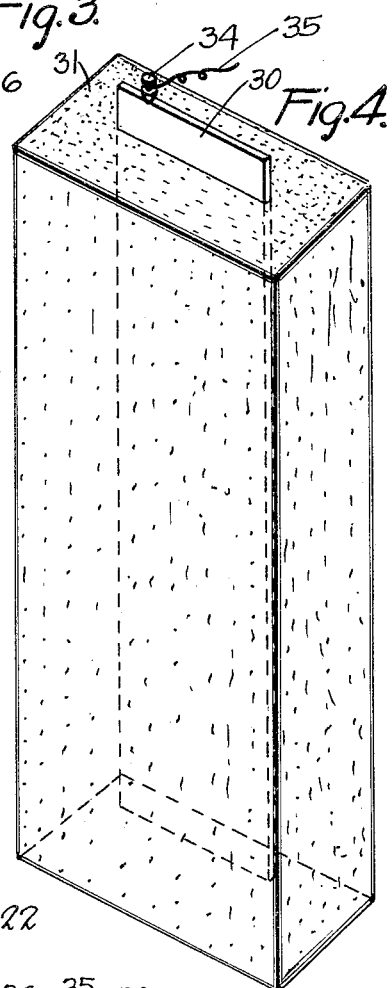
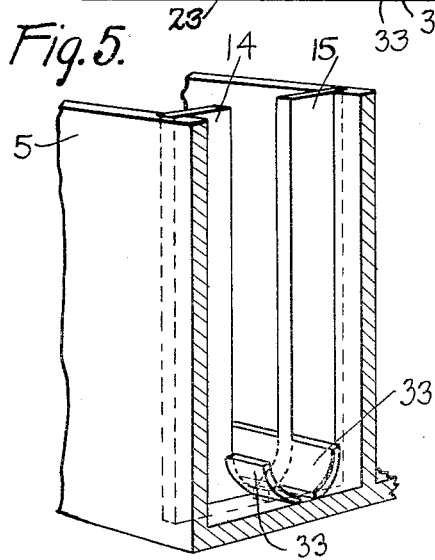
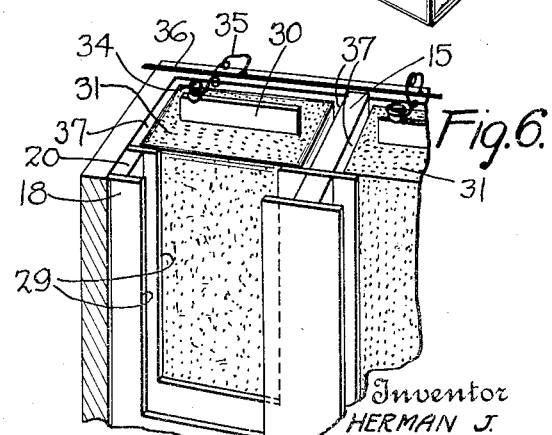
Inventor
HERMAN J. SCHNEIDERWIRTH
By His Attorney
John J. Lynch Patented Feb. 14, 1933

1,897,217

UNITED STATES PATENT OFFICE

HERMAN J. SCHNEIDERWIRTH, OF YONKERS, NEW YORK

PURIFICATION APPARATUS

Application filed October 22, 1929. Serial No. 401,570.

This invention relates to the purification of liquid and in particular to a process in which an electrodialysis is combined with an electrolysis.

A particular object of the invention is to provide an apparatus in which, instead of a so-called diaphragm which has been used to separate the liquid to be purified entirely from the electrode and which diaphragm is permeable only for certain impurities, ion and other electrically charged matter, but not for the liquid to be purified itself; a cut-out form of diaphragm is used while the electrode behind the modified or cut-out form of diaphragm is covered with a porous mass permeable for the liquid to be purified.

A further object of my invention is the provision of an apparatus in which all or a number of the diaphragms heretofore used in the electrodialytic purification process of liquids may be eliminated or modified by applying, instead of full diaphragms, diaphragms having large cut-outs in combination with electrodes covered with porous masses which absorb and eliminate certain impurities such as calcium, magnesium, iron, aluminum and other compounds which have been held especially responsible for clogging up the full diaphragms, thereby increasing the resistance to the electric current and finally stopping the further penetration of other salts and impurities through the diaphragm.

A still further object of the invention is to provide a purification apparatus which can be constructed in continuous lines of separated, three-cell systems, the whole of which can be put up or dismantled and cleaned with a minimum of time and effort.

It is well known that in the purification of liquids by electrodialysis, the diaphragms, especially the cathodic ones, are very quickly clogged up and corroded by discharged ions and other impurities like calcium, magnesium, iron, aluminum and clay (at the anodic diaphragms), and other impurities, increasing the resistance to the electric current, making the diaphragms more and more impermeable for the impurities and finally bringing the process more or less to a stop. It is therefore one of the greatest difficulties in the technical application of electrodialysis where a continuous work for days and weeks without change of diaphragms is essential for economical operation. Furthermore, diaphragms are comparatively expensive parts of the equipment and are spoiled and destroyed after they have been clogged up once or twice as above described. Up to the present time, there has been only one possibility of diminishing these difficulties and that to a very small extent which consisted of treating the liquid to be purified first by plain electrolysis, filtering the liquid to remove the impurities precipitated by this process and then subjecting the liquid to an electrodialytic process. Most of the impurities causing a clogging up of the membranes are, however, after the preliminary purification process, resorted to still present and the same difficulties occur after a certain time.

I have found that almost all of the impurities mentioned above can be removed by combining electrolysis with electrodialysis in the single cell, three unit arrangement that I employ.

To enable others skilled in the art to comprehend the underlying features of my invention that they may embody the same in various modifications in structure and relation contemplated, drawings depicting a preferred form have been annexed as a part of this disclosure and in such drawings, similar reference characters denote corresponding parts throughout all the views, of which, Figure 1 is a top plan view of the apparatus constructed in accordance with my invention showing the electrodialytic and the electrolytic purification of a liquid in a cell unit.

Figure 2 is a section taken on the line 2—2 of Figure 1 and shows the construction of my improved apparatus.

Figure 3 is an enlarged section in elevation taken on the line 3—3 of Figure 1 showing the construction of the lateral cell walls which are used to hold in place a membrane which divides each partitioned space into three cell units.

Figure 4 is a view in perspective of the form of electrode arranged for use in connection with my improved apparatus.

Figure 5 is a view in perspective of a portion of the apparatus showing the partition member arranged to receive the membrane through the medium of which a compartment is divided into three cells, and Figure 6 is a view in perspective of the electrode as employed which is wrapped in a porous mass arranged to substantially fill a cell, the membrane for use in connection therewith showing the cut-out arrangement thereof.

Figure 7 is a view of a modified form of perforated electrode.

The purification and separation of liquids with the aid of an electric current between two separating walls has been heretofore introduced in the chemical industry. My improved electrodialytic and electrolytic process is based on principles which employ an apparatus divided into five cells containing in each cell arrangement, two outside cells in which are disposed electrodes, one of which is used as an anode and is made of magnetite, carbon or other suitable material, while the other is used as a cathode and is made of iron, brass or other suitable material. The middle cell contains the liquid to be purified and the liquid moving from one middle cell to the adjacent middle cell and so on between the side cells of the apparatus is constantly acted upon by the electrodes. The walls separating the middle cell from the outside cell are termed, membranes. The latter, except in their cut-out portions, are water-tight and impermeable for certain materials but under the influence of an electric current, they are permeable for salts and their electrically charged disassociated parts, called ions, and for certain other electrically charged materals. The membranes are usually made of sail cloth, cotton, parchment, leather, clay and other materials according to the work to be carried on. They may also be made in different densities, either impregnated or not.

The practical application of my process makes necessary the construction of an apparatus which will work continually and is suitable for conditions in a large plant and with this in view, I have constructed a form which may be made up in any number of units, which may be of any length or width desired and may contain any number of cells. In the drawings, a single unit is illustrated and contemplates the use of a box or casing 5 made of wood or other insulating material and having slotted end and slotted side walls 6 and 7 respectively. The casing is further provided with partition forming holders 13 which are arranged to be slid down into the slots formed in the side wall 7. These holders 13 are divided into two portions 14 and 15, as illustrated in Figure 5, each of the portions being substantially alike and being arranged to support between them, a longitudinally extending membrane 18. This membrane is made of any suitable material which is permeable for the ion that it is contemplated will be drawn from the water to be processed or from the liquid that is contained in the central cell which is formed by the diaphragm.

Inspection of Figure 3 will show that the membrane 18 is substantially U-shaped in cross section, extends between the two end walls 6 of the casing and provides the central cell 19. Suitable wall pieces 20 in the nature of partitions having semi-circular lower edges are employed to maintain the membrane 18 in its U-shaped formation. The wall pieces 20 are maintained in spaced relation through the medium of the spacers 12 which are also semi-circular in cross section and assist in maintaining the membrane in its U-shaped formation. The wall pieces 20 and spacers 12 are secured in the membrane 18 in any suitable manner, the wall pieces 20 being in alignment with the opposing edges of the holders 13 and arranged to be acted upon by the portions 14 and 15 thereof in a manner to be hereinafter described. Each of the portions 14 and 15 of the holders 13 are identical and it is not believed necessary to describe both of them, it being sufficient to say that the portion 14 is provided with the relatively movable parts 16 and 17 which are maintained in spaced relation through the medium of the coil springs 10 which are suitably connected to said parts 16 and 17.

When the membrane is fastened in place by strings, rubber bands or other suitable media, the filler parts 12 and 20, which are slightly wider than the unoccupied space between the parts 14 and 15, are pushed in and positioned between said parts 14 and 15 of the holders, where they will be effectively held through the medium of the pressure exerted by the coil springs 10. The members 14 and 15 are completely covered with sheet rubber or other insulating, elastic waterproof material 21 and are arranged to be stuck down into slots formed in the side walls 7 of the casing 5, the slots being indicated by the numeral 22. These slots continue across the bottom of the casing as at 23, so that the compartments formed by support 13 may be separated from each other and are of an individual nature. Each casing is formed into a fine cell unit through the medium of the membrane 18 and the filler block or walls 20. Each of these wall pieces 20 is provided with a pipe 24 whereby the water or liquid can pass from one cell to another and from end to end of the casing 5 to be acted upon by the minus and plus electrodes 25 which are positioned in the side cells 26.

In carrying out a combination process embodying electrolysis and dialysis, the membrane as particularly illustrated in Figure 6 is provided with openings therein as indicated by the numeral 29. The electrode positioned in the side cell 26, indicated by the numeral 30, may be of the solid type and is preferably substantially as wide as the cut-out 29 in the membrane 18. The electrode is covered with a porous mass 31 which may be of different material than those used at the opposite sides of the unit. For instance, the porous masses at the anodic side or surrounding the anodic electrode may be made from electropositively charged substance, such as animal refuse, hair, skin, leather parts and other substances of organic or inorganic origin. The porous masses 31 at the cathodic side may be made of a positively charged material, for instance, vegetable matter, cotton, sponge refuse, cocoanut grass and any other suitable material. Under certain conditions, the porous mass may be of an electric charge opposite to the charge of their respective electrodes, it of course being understood that the porous mass is very closely associated with the electrodes.

It will be noted that the porous mass fits closely against the membrane and the edges of the cut-out portion of the membrane closely overlaps the face of the porous material, the material being suitably cut away as at 32 to fit over the extended portion 33 of the members 14 and 15.

The process, as described is an electrolysis with regard to the cut-out part of the membrane and electrodialysis with regard to the overlapping part of the membrane. It is understood that the overlapping part of the membrane fits closely upon the parts of the porous masses surrounding the electrode which it covers and that this new process can also be used in combination with plain electrodialysis in combination with an apparatus working continually throughout a multiple of cell arrangement, as described in my patent application, Serial No. 262,967, filed March 19, 1928.

Each of the electrodes 30 is provided with a contact or terminal screw 34 and through the medium of a wire 35 is secured to an adjacent bus bar 36, the bus bars being mounted on the opposite side of the receptacle 5 and being designated as plus and minus.

I have noted that the impurities discharged and deposited in the porous masses cannot flow back into the liquid to be purified as in the case of plain electrolysis but are permanently held back. Some of the impurities precipitate but they cannot flow back into the liquid to be purified on account of the overlapping membrane. They therefore settle on the bottom of the apparatus adjacent the ends of the membrane in the small spaces 37, see Figure 6, provided for that purpose.

In my experiments in which I compared the purification of the same liquid treated under ordinary electrolysis and with my new process using the same amount of electric current, time, electrode spacing and other similar conditions, I found that the liquid treated with my process lost 75% of its total impurity against an elimination of only 20% when the purification was carried out by the ordinary electrolysis method. It is noted that the amount of soluble ion like potassium, sodium and chlorine present after my treatment was decreased about 30% while electrolysis did not remove any of them. The porous masses also in my process which are used to surround the electrodes and can really be constituted as electrodes can be used for a much longer time than diaphragms under the same conditions without decreasing the effect of the process. After the masses have become filled up with deposits, they can be readily exchanged for new ones which is of course much simpler to accomplish than the exchange of membranes. The cost of these masses is very low as they are made from refuse from different industries.

In Figure 7, I have illustrated a modified form of electrode which is to be encased in the porous mass but which is perforated as at 37, the width of the perforations being indicated by the letter A, being substantially equal to the width of the opening 29 in the membrane 18. The preferred form is of solid electrode but it is equally important under certain conditions that the perforated electrode be employed, it being understood that the area of the perforated portion is substantially the area of the cut-out portion of the membrane. This improved electrode may be used at the cathodic side as well as at the anodic side and in either instance, the cut-out of the membrane may differ in size according to the conditions of the liquid to be treated, the amount to be used and other contingencies.

A perforated electrode is advantageous because it permits the ions to go through the holes in the electrode and settle in the mass beyond the electrode. These openings therefore, assist in the absorption of the impurities by the mass at the far side of the electrode and were it not for the fact that the electrode is perforated this portion of the mass would not be as useful as is the portion of the mass in front of the electrode.

It is evident, therefore, that I have provided a liquid purification apparatus of simplified construction, involving few parts, which may be readily assembled and dismantled and a construction which lends itself to modifications in any number of units to take care of manufacturing conditions. It is also evident that in this apparatus, the advantage of two processes is employed, namely, an electrodialytic process and an electrolysis process which increases the efficiency of the process and carries on the work much more rapidly than has heretofore been possible.

While I have illustrated and described my process with some degree of particularity, I realize that in practice various alterations therein may be made in the apparatus for carrying it out and I therefore claim the right and privilege of changing the form of the details of construction or otherwise altering the arrangement of the correlated parts without departing from the spirit of the invention or the scope of the appended claims.

Having thus described my invention, what I claim is:—

1. An apparatus for the treatment of fluids comprising a casing, a membrane having cut-out portions positioned in said casing, an electrode at one side of said membrane in alignment with a cut-out portion and a porous mass surrounding said electrode and closing said membrane cut-out portion.

2. An apparatus for the treatment of fluids comprising a container, a porous membrane having a cut-out portion, the membrane being positioned in said container to define a cell, an electrode in the cell, a porous mass of animal or vegetable matter surrounding said electrode and said porous mass being arranged to cover the cut-out portion of said membrane.

3. An apparatus for the treatment of fluids comprising a casing, a plurality of multi-cell units therein, a membrane having cut-out portions defining the cells of a unit, electrodes in some of said cells, porous masses of semi-permeable material surrounding said electrode and closing said membrane cut-outs, electric current conducting members on said casing and connections between said electrodes and said members whereby an electro-dialytic action is produced between the electrodes.

4. An apparatus for the treatment of fluids comprising a casing, walls forming partitions in said casing, holders positioned in said partition walls, said holders constituting dividing walls, membranes having cut-out portions therein positioned in said holders and extending from end to end of said casing, electrodes positioned adjacent said membranes and porous masses of semi-permeable material surrounding said electrodes and closing the cut-out portions of said membranes.

5. An apparatus for the treatment of fluids comprising a casing having a compartmental channel, means of communication between the compartments, a longitudinal wall of the channel being formed of an apertured membrane, the space between the channel and the casing walls being divided into compartments corresponding to the channel compartments, and electrodes in the casing compartments opposite the openings in the diaphragm, the electrodes being packed in a diaphragm material which closes the openings in the channel diaphragm, the packing material for the anodes being a positively charged porous mass and the packing for the cathodes being a negatively charged porous mass.

6. An apparatus for the treatment of fluids comprising a casing, an apertured membrane dividing the casing into compartments, an electrode in one of the compartments, a semi-permeable mass on the electrodes closing the opening in the membrane and means of communication to and from one of said compartments.

7. An apparatus for the treatment of a fluid comprising a container, a membrane having an opening therein positioned in the container and constituting one wall of a cell, an electrode in the cell, and a mass of porous material surrounding the electrode, substantially filling the cell and closing said opening.

8. An apparatus for the treatment of fluids comprising a casing having compartments, an apertured membrane constituting a wall of said compartment and forming a channel between said compartment, and electrodes in said compartments packed in semi-permeable material which closes the opening in the membrane.

In testimony whereof, I have signed my name to this specification, this 8th day of October 1929.

HERMAN J. SCHNEIDERWIRTH. [L. S.]